(No Model.)
C. G. HAWLEY.
ACETYLENE GAS LAMP.
No. 586,517. Patented July 13, 1897.
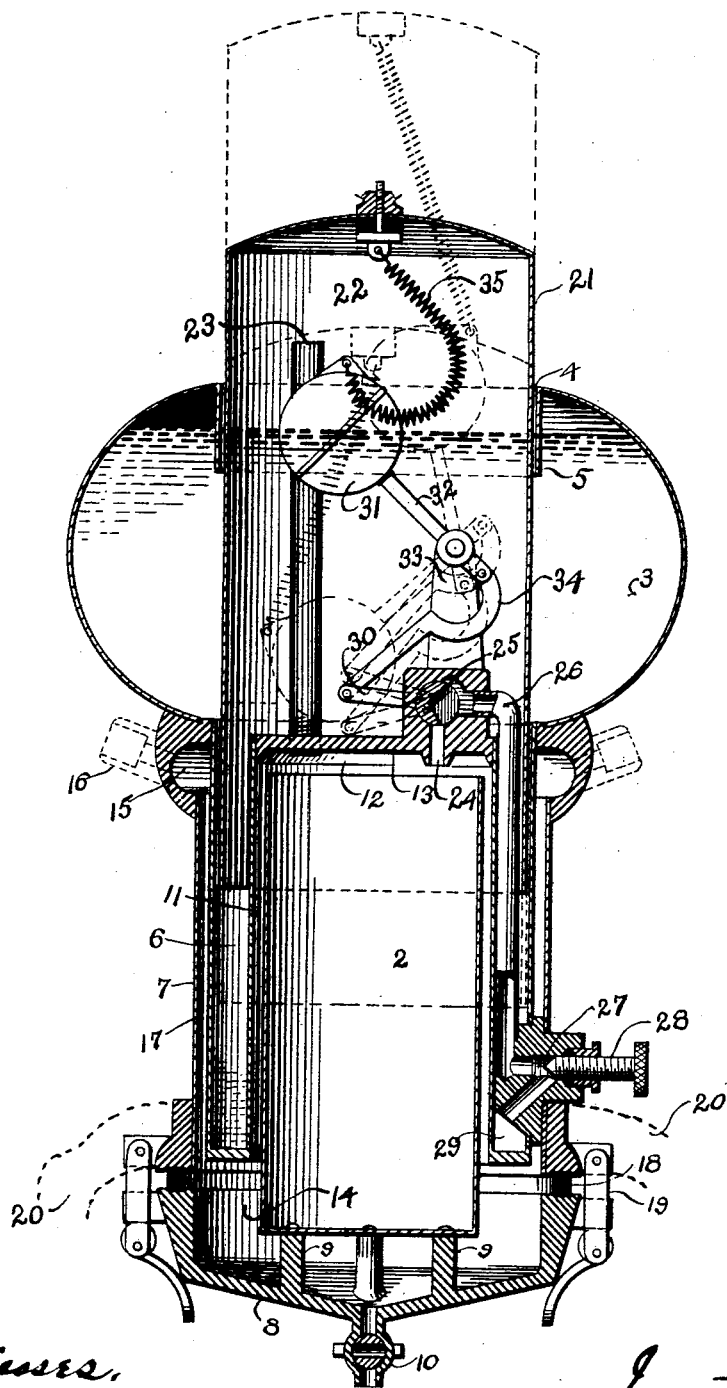
Witnesses.
W. A. Roberts
A. C. Paul
Inventor,
Charles G. Hawley.

UNITED STATES PATENT OFFICE.

CHARLES G. HAWLEY, OF MINNEAPOLIS, MINNESOTA.

ACETYLENE-GAS LAMP.

SPECIFICATION forming part of Letters Patent No. 586,517, dated July 13, 1897.

Application filed May 1, 1897. Serial No. 634,700. (No model.)

*To all whom it may concern:*

Be it known that I, CHARLES G. HAWLEY, of the city of Minneapolis, county of Hennepin, State of Minnesota, have invented certain new and useful Improvements in Acetylene-Gas Lamps, of which the following is a specification.

My invention relates to acetylene-gas lamps; and the object of the invention is to provide a gas-lamp which will be entirely automatic in its action, requiring absolutely no attention after the water has been turned on and while the water and carbid lasts.

The particular object of the invention is to provide means whereby the supply of water to the carbid is accurately and positively regulated and whereby the loss of head or pressure in the water receptacle or tank is compensated to maintain an equal flow of water at all times.

A further and particular object of the invention is to provide an acetylene-gas lamp of a simple and very cheap construction.

The invention consists generally in the combination, with a valve, of a float provided in connection therewith and whereby as the level of water falls in the tank said valve is correspondingly and proportionately opened.

The invention consists, further, in particular constructions and in combinations of parts, all as hereinafter described, and particularly pointed out in the claims.

The invention will be more readily understood by reference to the accompanying drawing, wherein the figure is an enlarged vertical section of an acetylene-gas lamp embodying my invention.

As shown in the drawing, 2 represents the carbid holder or receptacle.

3 represents the water tank or reservoir, having a large opening 4 in its top. The flange 5, depending from the opening 4, prevents the slopping of the water.

6 represents an annular water-leg depending from and communicating with the water-tank 3.

7 represents the lower outer wall of the lamp, and 8 is the bottom of the lamp, to which the carbid-holder 2 is attached, being secured to a standard or standards 9 within the bottom 8, which bottom is cup-shaped to contain the liquid of condensation, which liquid may be drawn from the bottom through a small faucet 10.

There is an annular space 11 around the holder 2 between it and the inner wall of the water-leg 6, and there is a small space 12 above the holder and beneath the bottom 13 of the tank 3, which bottom is supported or secured at the upper edge of the inner wall of the water-leg. The annular space 11 communicates with the large space 14 beneath the lower end of the water-leg and in the bottom 8, and this space in turn is connected with the channel 15 and the gas or burner pipes 16 by the annular space 17 between the outer wall of the water-leg and the outer wall 7 of the lamp. The bottom 8 and the carbid-holder are detachable, and to make a gas-tight joint between the bottom 8 and the outer wall of the lamp I insert a packing-ring 18 and provide small cam-levers or fastenings 19, by which the bottom is drawn up tightly. The legs 20 of the lamp preferably spring from the ring or casting on the lower end of the outer wall or cylinder 7.

21 represents a movable gas-holder adapted to rise and fall in the water-tank through the opening in the top thereof and also fitting in the water-leg 6, the depth of which water-leg allows the use of a tall gas-holder. The gas-space 22 in the top of the gas-holder is connected with the gas-chamber beneath the water-tank by a pipe 23, opening through the floor 13 and extending above the level of the water in the tank 3. The water drops upon the carbid through the hole 24 in the tank-bottom 13, and above this is the automatic valve 25, to which the water is conducted by the pipe 26, which extends downwardly into the water-tank to afford a column of water opposed to the gas-pressure. At the lower end of the pipe I provide a pin-valve 27, the pin 28 of which may be screwed in or out to open or close the passage for the water from the bottom 29 of the water-leg to the pipe 26. The valve 25 may be of any desired construction, but I prefer a simple plug-valve to which a lever 30 is attached.

31 is a small float adapted to rise and fall in the tank with the water therein, and the float-lever 32 is pivoted on a standard 33, extending upward from the bottom 13. The short arm of the float-lever is connected with the valve-lever 30 by a link 34, and the leverages are so proportioned that when the float is in its highest position, with the water at the level shown, the valve will be opened far enough to allow sufficient water to pass to generate gas for two burners. If only one burner is used, the water may be checked slightly by means of the pin-valve, or the movable gas-holder may be depended upon to close the automatic valve. The proportion of leverages between the floats and the automatic valve are such that the valve is slowly opened as the float falls with the water-level, the valve-opening being increased in proportion to the loss of head or water-pressure.

To provide for the automatic closing of the valve when too great a body of gas is generated or when both of the burners are shut off, valves for that purpose (not shown) being provided in the gas-pipes 16, I attach the float 31 to the gas-holder by means of the cord or chain or preferably a light coil-spring 35, whereby when the gas-holder is lifted by accumulated gas the float will also be lifted to completely close the automatic valve 25. The spring allows a slight further expansion or rise of the gas-holder after the valve is closed. The fastening of the spring to the gas-holder is such as to allow the removal of the holder, if required.

The form or design of my lamp is subject to many modifications and it admits of any degree of ornamentation and in the form shown presents a neat and artistic appearance. For most lamps I prefer to omit the movable gas-holder and the pipe 23, connecting the upper and lower gas-chambers. The great surface of the water-leg exposed to contact with the gas renders the same a most effective condenser.

Having thus described my invention, I claim as new and desire to secure by Letters Patent—

1. The combination, with a water tank or reservoir, of a holder for gas-producing material, a water-duct between them, a valve provided in said duct, and means whereby as the level of water falls in said tank the opening through said valve is increased, substantially as described.

2. The combination, with a water tank or reservoir, of a holder for gas-producing material, a water-duct connecting the same, a valve in said duct, and a float in said tank connected with said valve to gradually open the same in proportion to the fall of the head of water in said tank, substantially as described.

3. The combination, with a suitable holder for gas-producing material, of a water-supply therefor, a valve in connection therewith, and means for regulating the opening of said valve in proportion to the water-pressure, as and for the purpose specified.

4. The combination, with a suitable holder for gas-producing material, of a water-supply tank communicating therewith, a valve in said duct, means in connection therewith for proportioning the size of the opening through the valve to the water-pressure, a movable part effected by the accumulation or pressure of gas, and a connection between the same and said valve to close said valve, substantially as described.

5. The combination, with a suitable holder for gas-producing material, of a water tank or reservoir arranged above the same, a water-duct through which the water flows from the tank to said holder, and a valve in said duct, said duct having a vertical part wherein a column of water is opposed to the gas-pressure within said holder, substantially as described.

6. The combination, with a suitable gas-producing-material holder, of a gas space or chamber surrounding the same, a water-tank arranged above said holder, a water-leg depending from said tank into said space, said space having a gas-outlet, and said tank having an outlet through which the water enters said holder, substantially as described.

7. The combination, with the gas-producing-material holder, of a water-tank arranged above the same and having an opening or duct through which the water enters said holder, a water-leg depending from said water-tank and surrounding said holder, a movable gas-holder arranged in said tank and dropping into said water-leg, and a gas duct or pipe extending upward through said tank from said holder to the said gas-holder, substantially as described.

8. The combination, with the holder for gas-producing material, with a gas-space surrounding the same, a water-tank arranged above said holder, a water-leg depending therefrom into the space around said holder, both the inner and the outer surfaces of said water-leg being exposed to contact with the gas, a gas-outlet from said space, and means for feeding the water from said tank into said holder, substantially as described.

9. The combination, with the water-tank and the outer wall 7, of the water-leg depending from said tank and within said wall or cylinder 7, the holder for gas-producing material adapted to be inserted upward into the space within the inner wall of the water-leg, the bottom 8 detachably secured upon the lower end of said wall or cylinder 7, said tank having a duct or opening through which water enters said holder, and said gas-space having an outlet, substantially as described.

In testimony whereof I have hereunto set my hand this 27th day of April, A. D. 1897.

CHARLES G. HAWLEY.

In presence of—
RICHARD PAUL,
M. E. GOOLEY.